Patented Apr. 5, 1932

1,852,730

UNITED STATES PATENT OFFICE

MANFRED ALIOTH, OF BASEL, SWITZERLAND, ASSIGNOR TO FIRM "DURAND & HUGUENIN S. A.," OF BASEL, SWITZERLAND

MANUFACTURE OF DYESTUFFS OF THE ACRIDINE SERIES AND THE PRODUCTS

No Drawing. Application filed February 7, 1931, Serial No. 514,314, and in Germany February 15, 1930.

In the U. S. patent application Ser. No. 379,072, filed July 17, 1929, a process has been described which is based on the ordinary acridine orange manufacturing method (nitrating tetramethyldiaminodiphenylmethane to a dinitro body, reducing in this dinitro body the two nitro groups to amino groups, forming the acridine ring by boiling in an acid medium, with splitting off of ammonia, and finally oxidizing the leuco compound thus formed to obtain the dyestuff) and which process differs from the latter in as much as for the nitration of the tetraalkyldiaminodiphenylmethane more nitric acid is used, than is necessary for the formation of a dinitrobody. Dyestuffs are thus obtained which are entirely different from the corresponding acridine-orange dyestuffs and which dye silk and tannin-prepared cotton red-orange to brown-red shades.

It has now been found, that similar products can be obtained, if—instead of treating the tetraalkyldiaminodiphenylmethane with nitric acid in excess—an acridine orange itself, that is to say, a tetraalkyldiaminoacridine dyestuff corresponding to the following general formula:

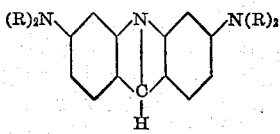

(wherein R stands for an alkyl) is nitrated and if afterwards the nitroderivative obtained is reduced. The leuco-compound thus formed is finally oxidized to the dyestuff, corresponding to the probable formula:

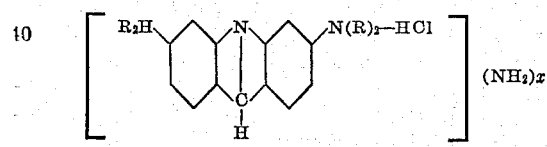

wherein $x$ stands for 1 to 2.

The acridine orange dyestuff is preferably used in the form of the colour base.

The quantity of the nitric acid used in this process may vary between certain limits, but should not exceed a proportion of two molecules for one molecule of the dyestuff to be nitrated.

By this nitration process, varying with the quantity of nitric acid used, probably 1 to 2 nitro groups are introduced into the molecule.

The products obtained according to the present process are basic dyestuffs, being in the form of their salts easily soluble in water, giving brown solutions. By adding sodium carbonate or ammonia to such a watery solution the colour base separates out as a brown-black precipitate. These dyestuffs are also soluble in alcohol; the solutions show a greenish fluorescence. With concentrated sulphuric acid these bodies give brown solutions, whilst the corresponding parent products dissolve therein with light yellow coloration and green fluorescence.

They yield on tannin prepared cotton as well as without mordant on silk, valuable brown to violet-brown shades.

The coloring matters prepared by the present process seem to have a similar constitution to those of the aforesaid patent application, but on account of their differences in shades and other properties, they cannot be identical thereto.

The new process is illustrated, but not limited, by the following examples.

Example 1

20 gr. of acridine orange base (see Colour Index No. 788) containing 67% pure base are dissolved, at ordinary temperature, in 200 gr. of sulphuric acid and the brown-yellow solution cooled down to 0° C. Then add, at 0–5° C., drop by drop the quantity of mixed acid required, so that 1 molecule of nitric acid is acting on 1 molecule of the base, i. e. for instance 30 gr. of a mixed acid of 10,5% nitric acid. The nitration mass is well stirred, keeping cool, for some hours, and then poured into 600 gr. of ice. The brown-red solution is reduced by addition of 25–30 gr. of zinc dust, whereby the temperature rises to 20–30° C.; the colour of the solution changes from brown-red to a light yellow; a test brought onto filter paper oxidizes very quickly in the air and becomes brown. Thereupon the solution is heated up to 90–95° C., cooled down and separated from the zinc residues by means of filtration. Finally the clear filtrate is oxidized with 40 ccm. of a solution of ferric chloride of 30%. After stirring for some time the dyestuff is precipitated by means of common salt. It is filtered off and dried.

The brown powder thus obtained is easily soluble in cold water and dyes tannin-prepared cotton ochre-brown shades.

Example 2

27 gr. of pure acridine orange base (see Colour Index No. 788) are dissolved at 30° C. in 400 gr. of sulphuric acid of 96%; to this solution are added, at 0° C., 90 gr. of mixed acid containing 10,5% of nitric acid (i. e. 1,5 molecules of nitric acid for 1 molecule of the base. After stirring for 4 hours at 0–10° C. the nitration mass is poured into 1200 gr. of ice water. The brown solution is reduced at 25° C. with about 60 gr. of zinc dust. The resulting light-yellow solution is now boiled up, filtered and after cooling down, 100 ccm. of a solution of ferric chloride of 30% are added. After oxidation has taken place, the dyestuff is precipitated by means of common salt, then filtered off, washed with salt water, dried and ground.

The product thus obtained is a brown powder, soluble in water and dyeing tannin-prepared cotton and silk deep-brown shades.

Example 3

To a solution of 13,5 gr. of pure acridine orange base, (see Colour Index No. 788) in 200 gr. of concentrated sulphuric acid are added, at 0–5° C., 63 gr. of a 10% mixed acid (2 molecules of nitric acid for 1 molecule of the base). The nitration mass is left standing for several hours and is afterwards poured into 800 gr. of ice water, whereby some nitrous fumes will be produced. The solution is reduced with 35–40 gr. of zinc dust, filtered, after having been heated up to 90° C., oxidized cold with 60 ccm. of a 30% solution of ferric chloride and finally precipitated with salt. The dark-brown precipitate thus obtained is filtered off, washed neutral with salt water and dried.

The dyestuff is easily soluble in water and dyes tannin-prepared cotton full violet-brown shades.

In these examples instead of the ordinary acridine orange (=tetramethyldiaminoacridine) another tetraalkyldiaminoacridine, such as for example tetraethyldiaminoacridine, further symmetrical or asymmetrical dimethyldiethyldiaminoacridine, etc., may be used.

What I claim is:—

1. A process for the manufacture of brown to violet-brown basic dyestuffs, which consists in nitrating a tetraalkyldiaminoacridine containing probably one to two nitro groups and finally oxidizing the leuco compound thus formed to the dyestuff of the following probable formula:

dyestuff corresponding to the following general formula:

(wherein R stands for an alkyl) with a proportion of nitric acid not exceeding two molecules for one molecule of the colouring matter to be nitrated, reducing the nitro body 2. A process for the manufacture of brown to violet-brown basic dyestuffs, which consists in nitrating tetramethyldiaminoacridine corresponding to the following formula:

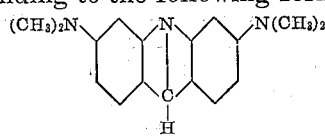

with a proportion of nitric acid not exceeding two molecules for one molecule of the colouring matter to be nitrated, reducing the nitro body containing probably one to two nitro groups and finally oxidizing the leuco compound thus formed to the dyestuff of the following probable formula:

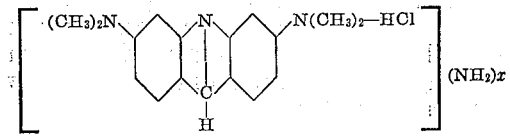

($x$ standing for 1 to 2).

3. A process for the manufacture of a brown basic dyestuff, which consists in nitrating tetramethyldiaminoacridine corresponding to the following formula:

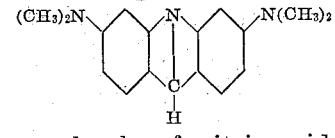

with one molecule of nitric acid for one molecule of the colouring matter, reducing the nitro body containing probably one nitro group and finally oxidizing the leuco compound thus formed to the dyestuff of the following probable formula:

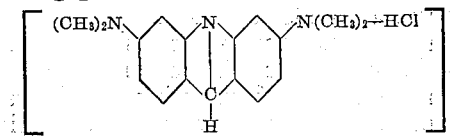

4. As new articles of manufacture the herein described basic dyestuffs, corresponding to the probable general formula:

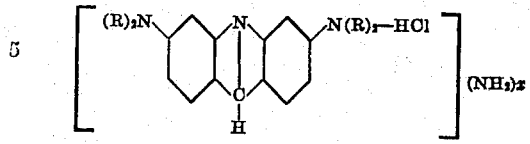

(wherein R stands for an alkyl and $x$ for 1 to 2), said basic dyestuffs constituting brown powders, being in the form of their salts easily soluble in water, giving brown solutions, from which alkalis precipitate the dyestuff-bases as brown-black powders, said dyestuffs dissolving in concentrated sulphuric acid with a brown colour without fluorescence and yielding on silk and tannin-prepared cotton brown to violet-brown shades.

In witness whereof I have hereunto signed my name this 29th day of January 1931.

MANFRED ALIOTH.

Certificate of Correction

April 5, 1932.

Patent No. 1,852,730.

MANFRED ALIOTH

It is hereby certified that error appears in the printed specification of the above-numbered patent requiring correction as follows: Page 2, beginning with line 63, strike out all to and including line 86, comprising claim 1, and insert the following as claim 1:

1. A process for the manufacture of brown to violet-brown basic dyestuffs, which consists in nitrating a tetraalkyldiaminoacridine dyestuff corresponding to the following general formula:

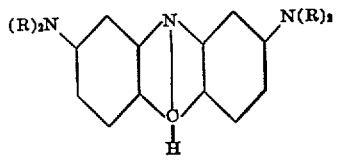

(wherein R stands for an alkyl) with a proportion of nitric acid not exceeding two molecules for one molecule of the colouring matter to be nitrated, reducing the nitro body containing probably one to two nitro groups and finally oxidizing the leuco compound thus formed to the dyestuff of the following probable formula:

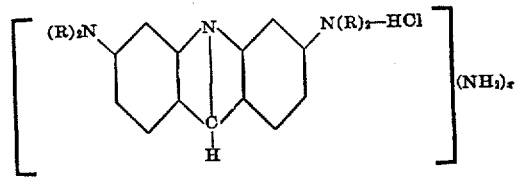

($x$ standing for 1 to 2).

and that the said Letters Patent should be read with this correction therein that the same may conform to the record of the case in the Patent Office.

Signed and sealed this 4th day of October, A. D. 1932.

[SEAL.]

M. J. MOORE,
*Acting Commissioner of Patents.*